(12) United States Patent
Rodriguez

(10) Patent No.: US 8,583,574 B2
(45) Date of Patent: Nov. 12, 2013

(54) METHOD OF AND APPARATUS FOR COMBINING ARTIFICIAL INTELLIGENCE (AI) CONCEPTS WITH EVENT-DRIVEN SECURITY ARCHITECTURES AND IDEAS

(75) Inventor: Ralph A. Rodriguez, Taunton, MA (US)

(73) Assignee: Delfigo Corporation, Boston, MA (US)

( * ) Notice: Subject to any disclaimer, the term of this patent is extended or adjusted under 35 U.S.C. 154(b) by 926 days.

(21) Appl. No.: 12/221,757

(22) Filed: Aug. 6, 2008

(65) Prior Publication Data

US 2010/0036783 A1    Feb. 11, 2010

(51) Int. Cl.
| G06E 1/00 | (2006.01) |
| G06E 3/00 | (2006.01) |
| G06F 15/18 | (2006.01) |
| G06G 7/00 | (2006.01) |
| G06N 3/02 | (2006.01) |

(52) U.S. Cl.
USPC .......................................................... 706/15

(58) Field of Classification Search
USPC ...................................... 706/15, 62; 726/4, 7
See application file for complete search history.

(56) References Cited

U.S. PATENT DOCUMENTS

| 4,805,222 | A |   | 2/1989  | Young et al. |
| 5,003,577 | A | * | 3/1991  | Ertz et al. .................... 379/88.13 |
| 5,621,889 | A | * | 4/1997  | Lermuzeaux et al. .......... 726/22 |
| 6,151,593 | A |   | 11/2000 | Cho |
| 6,546,392 | B1 | * | 4/2003  | Bahlmann ............................. 1/1 |
| 7,206,938 | B2 |   | 4/2007  | Bender et al. |
| 7,310,432 | B2 |   | 12/2007 | Xu |
| 2002/0055350 | A1 | * | 5/2002 | Gupte et al. .................. 455/412 |
| 2002/0055997 | A1 | * | 5/2002 | Pinnell .......................... 709/224 |
| 2002/0188854 | A1 |   | 12/2002 | Heaven et al. |
| 2004/0187037 | A1 |   | 9/2004  | Checco |
| 2005/0177750 | A1 | * | 8/2005  | Gasparini et al. ............. 713/201 |
| 2006/0242424 | A1 | * | 10/2006 | Kitchens et al. .............. 713/183 |
| 2006/0293978 | A1 | * | 12/2006 | Godlewski ...................... 705/28 |
| 2007/0198712 | A1 |   | 8/2007  | Mani et al. |
| 2007/0233667 | A1 |   | 10/2007 | Mani et al. |
| 2007/0234056 | A1 |   | 10/2007 | Mani et al. |
| 2007/0245151 | A1 |   | 10/2007 | Phoha et al. |
| 2007/0271466 | A1 | * | 11/2007 | Mak et al. ..................... 713/184 |

OTHER PUBLICATIONS

Kisida, "VPN-L Archives, Re : Win 2K Server / XP Client and VPN problem", Date: Sat , Sep. 28, 2002 11 : 19 : 30-0400.*
Abuguba, "Performance Evaluation of Rapid Spanning Tree Protocol by Measurements and Simulation", Budapest 2006.*

(Continued)

Primary Examiner — Jeffrey A Gaffin
Assistant Examiner — Ilya Traktovenko
(74) Attorney, Agent, or Firm — Maine Cernota & Rardin

(57) ABSTRACT

User authentication apparatus controlling access to systems, inputs owner's login name and password and then extracts the owner's timing vectors from keystroke characteristics with which the owner forms a training set. A semantic network uses multiple links to indicate that different pattern components of user's behavioral access create different kinds of relationships and "symbolic representations". A neural network is trained by using each of the owner's timing vectors in the training set as an input. When a user inputs the owner's login name and password, it's checked and the user's timing vector is extracted to type the user's password if checked and demoted in confidence level if otherwise. The user's timing vector is applied to neural network and difference between the input/output is compared with a predetermined threshold; and if the difference is greater than the threshold, is prohibited. Preferably this is aided by response time to personal questions.

21 Claims, 2 Drawing Sheets

(56) References Cited

OTHER PUBLICATIONS

Figure 1:
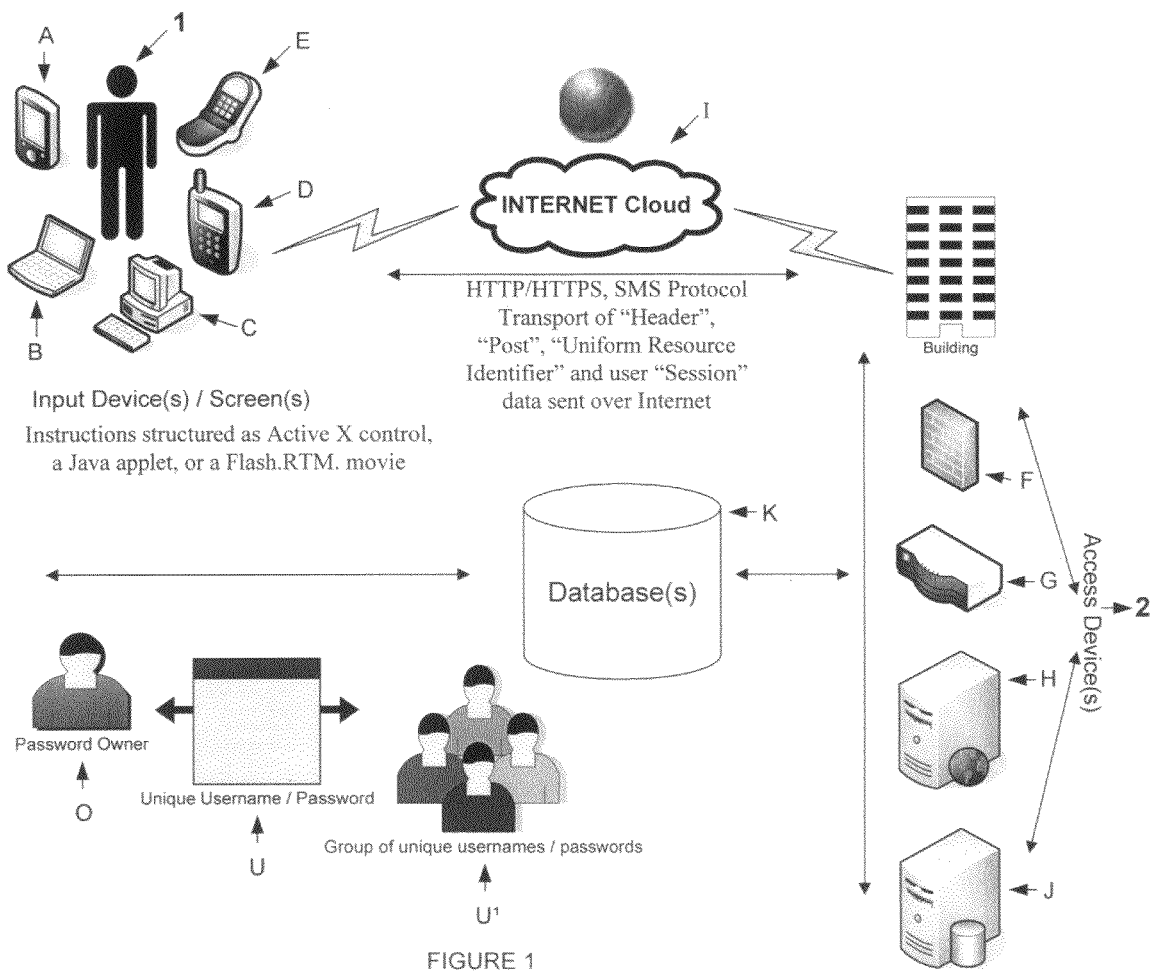

Ralph Rodriguez "An investigation relating to a sub-field of AI (artificial intelligence) with event-driven security architecture and ideas from 'The Emotion Machine'" Aug. 6, 2008; published in Massachusetts Institute of Technology (MIT) on Aug. 6, 2008, and on http://www.new-technologies.com/news.htm and http://www.cioam.com/MIT_CambridgeInstitute_Rodriguez.html Professor Marvin Minsky "The Emotion Machine", Jul. 28, 2005.
Forrester Research's Big Idea "The Natural Order of Security Yields The Greatest Benefits" Jul. 9, 2004.

* cited by examiner

METHOD OF AND APPARATUS FOR COMBINING ARTIFICIAL INTELLIGENCE (AI) CONCEPTS WITH EVENT-DRIVEN SECURITY ARCHITECTURES AND IDEAS

FIELD OF INVENTION

The field of this invention is generally that of securing would-be user access to a secure informational system of any kind, going beyond conventional password, ID, "heart beat", and other inputting biometric verification concepts and, more specifically, incorporating selected artificial intelligence (AI) concepts into the security-accessing and authorization inputs; and still more particularly, though not exclusively, embodying the techniques and system described in my previously confidential, unpublished paper in Massachusetts Institute of Technology (MIT) course 6.868, entitled "An investigation relating to a sub-field of AI (artificial intelligence) with event-driven security architecture and ideas from *The Emotion Machine*" book of Professor Marvin Minksy, (Jul. 28, 2005), this paper sometimes hereinafter being referred to as "my MIT paper", which is now published as of even date simultaneously with the filing of this present patent application, on Websites http://www.new-technologies.com/news.htm and http://www.cioam.com/MIT_CambridgeInstitute_Rodriguez.html, and incorporated by reference into this patent application.

BACKGROUND

In this background section there is presented, in order to distinguish the novel features of the present invention, a general description of the problem facing giving access authorization to a secure information system, both in terms of commercial and government security needs, and a summary of where the prior art leaves off and the present invention provides additional artificial intelligence levels of security.

General Discussion

The biggest current security issues can best be described by reference to Forrester Research's Big Idea on "The Natural Order of Security" (Jul. 9, 2004, called *The Natural Order of Security Yields The Greatest Benefits*)—i.e. that security issues are both maturing and recycling continuously; from authentication and authorization to administration and audit. This continual cycle, as companies looking back into the organizations to try and validate security decisions made, coupled with measuring the increasing needs of the enterprise for major issues such as enterprise single sign-on (E-SSO), identity management, fraud and authentication, involve critical areas that lead the way to address these problems. Add compliance, governmental directives and ease of use requirements into the mix, and one becomes engulfed in a security management quagmire.

To address this complex mix of issues for businesses, there is an opportunity underlying the present invention, to demonstrate an identity theft and fraud detection system supplemental to using key artificial intelligence concepts as from Minsky's *The Emotion Machine*. This invention will address two key areas; authentication and authorization—attempting to overcome previous learning schemes, such as statistical analogical-based only, including the optimization paradox, wherein the better a system already works, the more likely each change will make it worse; and the parallel processing paradox wherein the more that the parts of the system interact, the more likely each change will have serious side effects.

In other words, as a system gets better, it may find that it is increasingly harder to find more ways to improve itself. As Minsky states, "evolution is often described as selecting good changes—but it actually does far more work at rejecting changes with bad effects. This is one reason why so many species evolve to occupy narrow, specialized niches that are bounded by all sorts of hazards and traps. Humans have come to escape from this by evolving features that most animals lack—such as ways to tell their descendents about the experiences of their ancestors".

Starting in the mid-1990s, Internet browser-based authentication and authorization were used as simple methods to validate a user's access to a system and its database via an often simple username and password. This did not address, however, whether the user's password had been stolen or borrowed, nor did it make any intelligent decisions as to where this user could be permitted to go beyond what access and privileges were originally set up. Additionally, as enterprise applications get ported to the world-wide-web over mobile communications, smart phones and PDAs, the ability to track and trace an individual user becomes more difficult and inherently prone to identify theft and potential fraud.

In accordance with the present invention, address authentication and authorization is allowed, but in a whole new paradigm. This new paradigm addresses authentication such as "are you who you say you are?" to detect identity theft, based on the system's unique statistical tracking method and algorithm, coupled with AI-based concepts like semantic networks to decide your authorization as said "are you who you say you are?", "where will I allow you to go?" and "what level of system access will I give you?" —to prevent fraudulent activity, and in real time, before it happens—not after a breach or theft has occurred.

AI-Based Event-Driven Architectures (EDA) and Security

Event-driven architecture is about creating workflow efficiency as organizations are moving toward an application environment focused on individual "triggered" events and looking for correlation between events that are meaningful. The challenge with systems such as security architectures is that these trigger logic-based data only, and don't account for many of the other concepts, as detailed in said *The Emotion Machine*. Given the unpredictable, asynchronous nature of today's business world, seamless business processes are predicated upon an architecture that can respond to discrete events in real-time without imposing a significant processing burden or causing major workflow disruption. Recent findings confirm this trend toward event-driven software by revealing that more than a third (39%) of top-performing companies rated event-driven architectures (EDA) as the most important feature of an integration solution.

Event-driven software in its most basic form, however, has been around for many years, but the formal incorporation of this technology into existing software applications such as security systems and tools is relatively new. Momentum appears to be in the direction of event-driven software, and that top-performing companies have been more than three times as likely to support event-driven business process management.

While there is an unmistakable need for technology that allows for the real-time sensing of, and response to key business events, market deployment of event processing solutions is still quite immature and could use significant improvement by incorporating other AI-based concepts, particularly in accordance with the present invention, that could put context into a given "triggered"-based event to find a particular "pattern" and "analogy".

Using key AI concepts, indeed, as experienced by Minsky, suggests a model of mind based on reacting to 'cognitive obstacles'—a so-called "critic-selector" model. There are "critic" resources each of which can recognize a certain species of "Problem-Type." When a "critic" sees enough evidence that one is facing its type of problem, then that "critic" will try to activate a "Way to Think" that may be useful in this situation. The goal for the concepts of this invention is to incorporate such models, as more fully explained in my said MIT paper, into a security system to give the system the ability to recognize a problem-type and to activate a way for the system to "think", that utilizes AI-based concepts. This increases system performance and creates a high-level form of system protection and authentication.

A trouble-detecting critic assumes the system contains one or more special "trouble-detectors" that start to react when the usual systems don't achieve some desired goal, such as access and authentication verification. Then, such a resource can go on to activate other, higher-level processes. This would begin to create self-aware security systems, having several systems and sub-layers, with goals to look beyond classical numerical, statistical and heuristic-based algorithms only to incorporate multiple critic models, each with their own singular purpose to detect an individual's access and authentication behavior.

These linked relationships may also be combined to create a symbolic user package and stored as a group in the database of the present invention to create a behavioral description and combinations with other like groups. These groups may also be added to the invention's access scheme to further determine the confidence level of system access validity.

Each one of the trouble detecting critics, moreover, may be self-contained with its own dedicated memory, CPU and specific task handling to solve a goal related to access and authentication.

Existing Security Models

The identity and fraud detection system of the present invention may incorporate multiple prior art methods to measure identity theft and fraud. The basic premise is, however, to create a real-time application and database usage profile using a novel complex validation algorithm which captures a user's rate of accessing a system and their password attempts in input typing speed and biometric entry style characteristics as, for example, in U.S. Pat. No. 7,206,938 and Patent Publication 2007 0233667),—also including time of day, time zone, internal data accessed, session information, environment and IP or GPS-based location, etc. The key measurements are to capture this information in real-time and at the sub-millisecond rate or better today and the nanosecond rate in the future, for fraud detection and monitoring.

If the system detects fraud, the unique AI-based workflow process of the invention begins. This workflow can process multiple methods of security. The system can prompt a user for an "n-tiered security profile" of data which the user set up initially. This tier security model, in turn, can use multiple standard models.

Before proceeding to describe the preferred embodiments of the present invention, it is in order to contrast said prior security models.

The Bell-LaPadula Security Model

The Bell-LaPadula security model, as explained more fully in my said MIT paper, was developed to formalize The U.S. Department of Defense multi-level security policy. The model is a formal state transition model of computer security policy that describes a set of access control rules of the use of security labels on objects, from the most sensitive to the least sensitive, and clearances for subject.

While the Bell-LaPadula model focuses on the confidentiality of classified information, the present invention preferably uses this model, for user's authorization data access should any initial identity theft or user fraud be detected. This security model is directed toward confidentiality (rather than data integrity) and is characterized by the phrase: "no read up, no write down".

With Bell-LaPadula, however, users can only create content at or above their own security level. Conversely, users can only view content at or below their own security level. The Bell-LaPadula model, however, has other weaknesses, explained in said MIT paper, including that the model is built on the concept of a state machine with a set only of allowable states in the system, with the transition from one state to another state, being defined by transition functions.

Based on these weaknesses, however, the present invention, while capable of using features of this model, creates a "Semantic Network", later more fully described, which combines higher level "symbolic representations" (rather than simple connections or links) to help solve more complex problems of detection by incorporating multiple models together and connecting them based on the nature of those relationships.

The Biba Integrity Model

The Biba Integrity Model describes rules for the protection of information integrity. In this formal model, the entities in an information system must be divided into subjects and objects. While the notion of a secure state is defined, each state transition must preserve security by moving from secure state to secure state, thereby only "Inductively" proving that the system is secure.

As better evident, with the present invention and the before-described "Critic-Selector" model, a system is implemented whereby the demotion of a user's right to access immediately flags this user, who then is not able to gain applicable access to like kind states; i.e. if fraud is detected—demote the user and flag the user and prevent access to like kind states.

The Clark-Wilson Integrity Model

The Clark-Wilson integrity model, unlike the above prior security models, is based on transactions; that is, a series of operations that transition a system from one consistent state to another consistent state. In this model, integrity policy addresses the integrity of the transactions.

The principle of separation of duty requires that the certifiers of a transaction and the implementer are different entities. Specifically, in the Clark-Wilson Model, only integrity verification procedures and transformation procedures.

If, however, the Clark-Wilson model fails, one may combine or compare the Bell-LaPadula and the Biba Integrity Model to create representations of all three groups.

Prior Art Patents and Publications

As before stated, biometric rhythms ("heart beats") have been used in security systems, as represented by the following exemplary patents and publications, which may also be usefully adapted to and incorporated within the systems of the present invention:

U.S. Pat. No. 7,206,938, previously referenced herein, focuses on the entry or input biorhythms of the user wherein the user recognition and identification technique involves the entering of text by a user at an input keyboard with evaluation against previously recorded training set keystrokes by the user for any presence of repeatable patterns that are unique to the individual user trying to gain access to secure information; the use of such biometric information as keystroke dynamics is measured at a user's computer to confirm the identity of a user for the purpose of allowing the user to have authorized access to files—in this case, to music files, as described in U.S. Patent Publication 2002 0188854 A1. The evaluation of a plurality of biometric measurements of a user is described in U.S. Patent Publication 2007 0233667 A1; the use of biometric security over a distributed network wherein a user communicates with a server via a distributed computer network collecting biometric information about a user at the user computer and transmitting such to the server during a partial exchange, is disclosed in U.S. Patent Publication 2007 0198712 A1.

U.S. Patent Publication 2004 0187037 A1 describes providing computer-based authentication by looking for patterns in a series of biometric samples, providing a mechanism that focuses on input keystrokes, wherein the system gathers user keystroke timing data and analyzes and abstracts such data into a template against which future keystrokes can be verified.

Another prior technique for using neural network architecture concepts to classify regions corresponding to a user's keystroke pattern, is presented in U.S. Patent Publication 2007 0245151 A1; and software systems for implementing weighted scoring of a plurality of measurements wherein the verified sum is compared to a threshold value to compare to an established result in general are described in U.S. Patent Publication 2007 0234056.

Prior personal identity verification by a biometric system providing advanced security and private characteristics of a user's identity is described in U.S. Pat. No. 7,310,432 wherein a neural net engine simulation software code combined of neural net weights is provided from a computer enrollment system that can be ported into an embedded microprocessor and memory; and in U.S. Patent Publication 2007 0150747 A1, a multi-model hybrid comparison authentification system collects measurements of physical and/or behavioral characteristics of a user inputting the system, wherein the measurements are processed by two or more processing engines to produce unified confidence measurement from weighted inputs.

U.S. Pat. No. 6,151,593 discloses an apparatus for authenticating a would be user trying to access a system input wherein the user is authenticated by a keyboard typing pattern also using a neural network system; U.S. Pat. No. 4,805,222 also discloses verifying the identity of an individual based on keystroke dynamics.

All such prior biometric and semantic and neural network architectures of the prior art are adaptable for use, with improvement, in verification and security clearance provided in accordance with the techniques underlying the present invention.

The Invention Concept

The invention, indeed, adds an additional level of authentification by combining such prior art biometric techniques with the novel concept of using in such security and identity fraud and theft prevention systems, of artificial intelligence-based architecture components that have not been so used heretofore, so far as is known to applicant, in the identity management and authentification field.

The present invention employs the additional security layer of artificial intelligence architecture algorithms—reflective thinking together with preferential keyboard input biometrics, to uniquely identify and authenticate such user with a greater degree of security; and to grant access to the information system at levels based on novel promotion/demotion algorithms presented herein.

As before intimated, the art of using such together with the concept of biometric rhythms and semantic and neural network information in the security access field together with artificial intelligence-based architecture and algorithms of reflective thinking, and algorithm promotion/demotion levels of access capability, appears to be novel to the present invention—certainly in the identity management and authentification field, as before stated.

The present invention, moreover, incorporates a novel two-factor supplemental, strong authentification that has the further advantage of requiring no costly hardware or expensive integration in existing corporate information systems. Indeed, just corporate identification and password entries are no longer adequate for secure access; and current two-factor authentication systems require costly hardware and expensive integrating to existing infrastructure which the present invention avoids.

Through its use of neural and semantic networks, indeed, the present invention assures a more secure and unique real-time user profile, using along with prior-art concepts in keyboard input biometrics, the artificial intelligence architectures, algorithms and reflective thinking additional layer of security; and, in addition to providing real time sensing decisions and responses to security threats, uniquely grants user access based on confidence attained through digital "heart beat" location specific information, and novel access level promotion and demotion to such user access.

The invention, indeed, provides a novel adaptive biometric access system and technique that monitors a user's electronic "heart beat" or unique pattern of system access and usage (such as the before-mentioned keystroke input characteristics, dwell time of input, etc.), with the added layer of artificial intelligence techniques to provide confidence in system access at different levels of authenticated security, adding the answers to two questions;

1. Do I trust you?; and
2. What level of access will I give you based on semantic and neural network information?

The former will include such items collected by the networks as time of day; GPS location; IP address; access point; internet browser type; information on previous system access.

In addition to such remote user accessing and information enterprise system or data base, the invention provides the before-mentioned secondary level of authentication through use of artificial intelligence architecture in asking personal questions that the owner should know the answers to instantly, but no one else would be as quick in response time. The measurement of the real-time of the beginning of the answer responding to these personal questions provides the measurement of the confidence level of the invention for providing access to different levels of security (measuring time of reflective thinking).

OBJECTS OF INVENTION

It is therefore a primary object of the present invention, accordingly, to provide a new and improved method, apparatus and architecture for insuring proper level of security clearance access to an information system or the like that adds to prior authentication models, including environment-gathering data of semantic and neural networks, the supplemental level of security of access of incorporated artificial intelligence architecture into the authentication and authorization of access to the information system.

A further object is to provide a novel additional security and fraud prevention real time technique to prior art biometric or "heart beat" techniques or models through the reflective thinking time of response to personal questions intimately known to the owner but that may take a finite response time for a user to try to answer.

Still another object is to provide a novel adaptive biometric user measurement system and apparatus into which has been incorporated a per key time at the user input keyboard (the time difference as in milliseconds between user's press and release of a key on the keyboard); pattern gap (the time delay between two consecutive user key strokes); and reflective time (the difference between the time a personal question was asked and the time the user started to enter the answer to the question, and authentication matrix, and information about the environment gathered by the semantic and neural networks).

Underlying the above objects of the invention are certain mathematical rules of the adaptive biometric system of the invention:

1. Per key time of the user must match the recorded-stored existing training set of natural per key time of the owner;
2. The pattern depth of the user also must match the existing recorded-stored set of pattern depth;

The personal key time can be classified into two different types;
- Natural, where the answer is given by the subconscious mind; and interpretive or reflective per key answer, given after a few fractions of time interval lapse (reflective thinking).
- When the password owner is asked a follow-on question(s) related to personal security profiles (such as your mother's name? your auto-plate number? etc.), the answer will immediately be returned since it is registered in the subconscious mind of the owner.
- But if someone else is answering, that user must think or research for some fraction of a second to get the answer because it will not be registered in the user's subconscious mind.

An additional object of the invention, therefore, is to add to an adaptive biometric security system, the reflective thinking levels of security of personal questions using artificial intelligence concepts.

Other and further objects will be explained hereinafter and are more specifically pointed out in the appended claims.

SUMMARY

In summary, however, from one of its broad aspects, the invention embraces a user authentication method for use in controlling user access to a data information system having an input, that comprises;

inputting at such input the owner's log-in name and password;

extracting the owner's timing vectors from biometric inputting characteristics with which the owner repeatedly inputs the owner's password to form a training set;

setting up a semantic network using multiple links to indicate that different pattern components of a user's behavioral access to the input create different kinds of symbolic representations rather than just simple connections or links;

setting up neural network training by using each of the owner's timing vectors in the training set as the input thereto;

checking if the user's password is identical to the owner's password when a user thereafter inputs the owner's log-in name and password;

extracting the user's timing vector from said user's inputting characteristics to derive the user's password if user checking is affirmative;

otherwise, demoting the user in confidence level for accessing the system;

applying the user's timing vector to the training neural network as an input;

comparing the difference between such input and output of the neural network with a predetermined threshold; and permitting user access to the system if the difference is not greater than such threshold, while demoting the confidence level or totally prohibiting access to the system, if otherwise.

From another viewpoint, the invention embraces, a method of providing additional security to a user's accessing of a secure information system, by password, ID and dynamic biometric inputting characteristics of the user, that comprises, incorporating an artificial intelligence (AI) architecture feature wherein highly personal questions are asked of the user that only the owner of the password and ID would be able to answer instantaneously from the subconscious mind, as distinguished from a user other than the owner who would require a finite response time;

establishing access-authorization confidence levels in accordance with such response times;

measuring the time for the user to commence responding to such personal questions; and assigning a level of confidence for access in accordance with such measured response times.

Preferred embodiments and designs and best mode of implementation are hereinafter described in detail.

DRAWINGS

Figure 2:
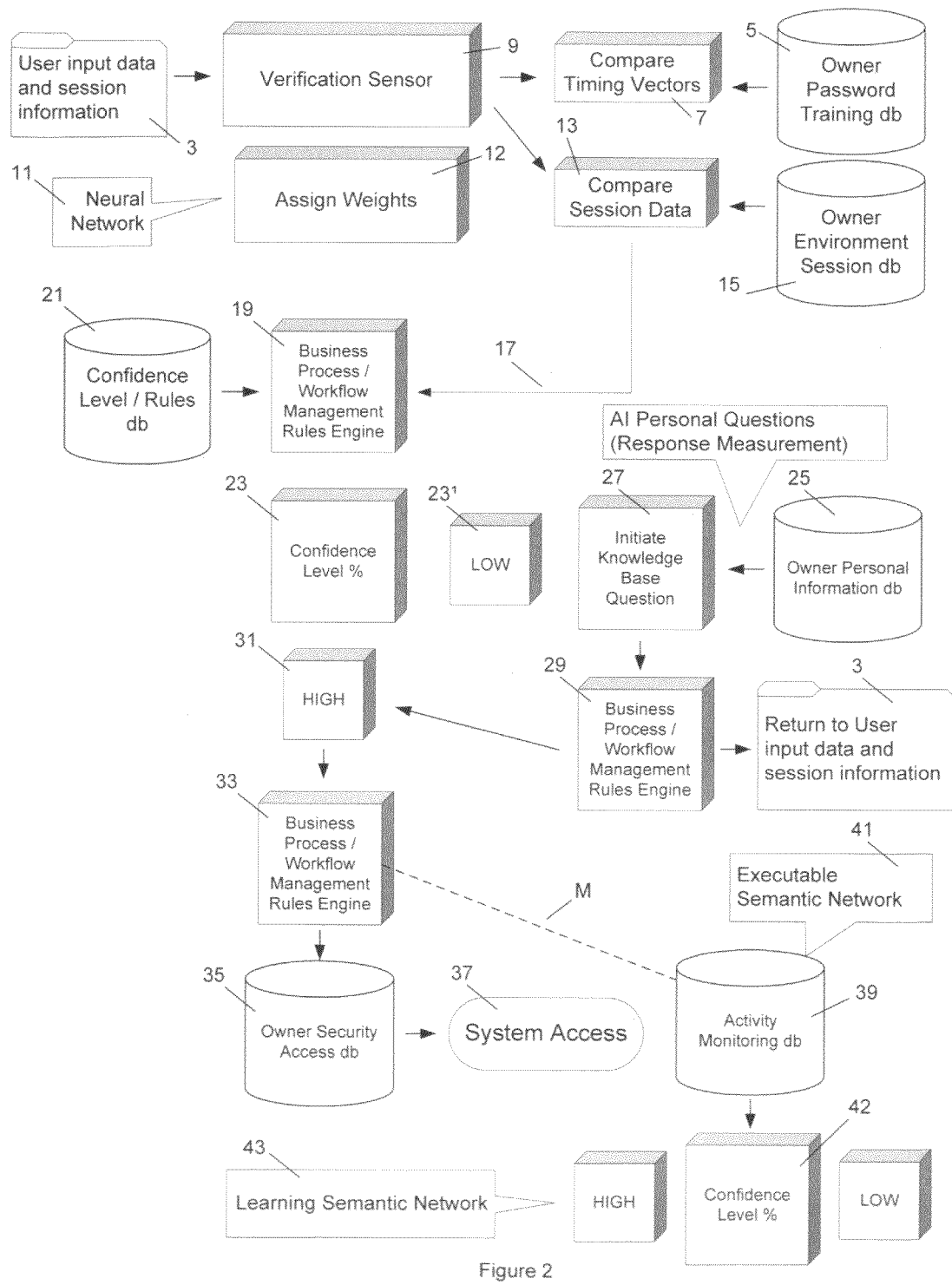

The invention will now be described in connection with the accompanying drawings, FIG. 1 of which illustrates a pictorial generalized diagram of how the security and authentication system of the invention operates to permit user access to an information system that requires security and fraud or theft protection; and FIG. 2 is a detailed block, flow diagram of a preferred embodiment of the present invention, incorporating the heretofore-described concepts of neural and semantic networks in a preferred form together with the supplemental level of security by the artificial intelligence (AI) architecture that asks personal questions that would be instantly known to the owner of the password, and measuring the "reflective thinking" time that it takes to respond to such personal question, thereby to determine an appropriate confidence level. As previously stated, it is not believed that this characteristic has been so used heretofore in security access systems.

PREFERRED EMBODIMENT(S) OF PRESENT INVENTION

As previously shown, prior art security checking models in the field of permitting access to secure materials and information have flaws which it is the intention of the present invention to eliminate or minimize. In addition, the present invention is distinguished by its use in limiting access to secure information through incorporating a novel manner to this field, novel techniques of artificial intelligence (AI) architectures.

A preferred embodiment of this invention builds upon prior biometric techniques for measuring security and prior semantic and neural networks for identifying security threats by analyzing multiple security threats in real-time ("semantic network" and "neural network" operations).

One of the important features that the present invention adds to and incorporates in such prior network operations is to add a new dimension to security confidence by determining from the environment of the operation of the system what test personal questions should be asked of the user that are personal to the owner and can be responded to instantaneously by the owner;

Referring to the drawings, an intended user is schematically shown at 1, in FIG. 1, employing any one of the number of input devices and screens for requesting access to an information system of any sort, indicated at 2, as through the Internet I. The input may structure instructions, for example, as an Active X control, a JAVA applet, or a Flash® movie, as represented by the conventional devices shown surrounding the intended user 1; namely, A. personal digital assistant (PDA);
B. keyboard and monitor;
C. computer;
D. Smart phone;
E. mobile cell phone; or any other well-known input device.

Various protocols may be used for transmitting the input request via the Internet I to any location, such as a building, so-labeled, containing conventional access devices to the ultimate information system 2. These exemplary protocols are shown as HTTP/HTTPS, SMS, transport of header, post, uniform resource identifiers and user session—all data sent over the Internet by the user 1 to access the information system 2.

The conventional access devices shown at the information system 2 are:

F. Firewall;
G. Router;
H. Web server;
J. Database server; or any other well known access device to which access may be attained by the user 1 depending on security clearance.

These access devices are shown in FIG. 1 as incorporated with corresponding illustrative databases K which ultimately provide data to validate the password and ID that may be entered in the input device by user 1, such as by the password owner O at a keyboard B or some other unique user U who is trying to input the system, or to a group of unique usernames or passwords $U^1$.

Returning to FIG. 2, the user input data, such as the before described keystroke rhythms and dwell time (on a keyboard of unit B FIG. 1, for example), may preferably introduce or input the owner password and ID, schematically illustrated at 3.

As previously explained, a training set and owner password database is pre-provided at 5 so that there can be comparison of the owner's password with that which the user is trying to input at 3. This is schematically shown at 7 in FIG. 1 comparing the database of the owners' actual password etc. with the password, ID etc. that the user is providing through the Internet, after verification sensing of the input at 9. The general assembly of blocks horizontally extending from the block labeled neural network 11 in FIG. 2 is assigned weights at the nodes as previously explained and is schematically shown at 12 in FIG. 2. This is compared at the comparator 13 with the owner's environment session database 15.

These comparisons of biometric typing timing vectors and compared environment data are then applied at 17 with the assigned weights to a business process/workflow management rules engine 19 establishing rules for assigning a confidence level from a database 21. That confidence level so established is schematically shown at 23; for purposes of illustration, is exemplarily shown as "low" at $23^1$. At this point, the before mentioned personal questions will be asked of the user based on the owner's personal information database 25, the personal questions at 27 being then asked of the user over the Internet.

The loop of initiating a personal question at 27 back to the user 3 is shown through a rules engine 29 returning to the user input data at 3 for a further test of whether the user "is who he says he is", and would thus be able to quickly respond to the question because the answer is in his subconscious mind (as distinguished from researching the answer or some other process). Ultimately, if the user "is who he says he is" (such as the owner) the confidence level instead of being demoted will be promoted to a higher confidence level 31.

Operating through the management rules engine with such high confidence level, the further management rules engine 33 will instruct owner identified security access through the database 35, permitting system access at 37.

Once the user has thus satisfied the system that he is entitled to access, being "who he says he is", and responding satisfactorily and instantaneously to a plurality of very personal questions, the user is continually further monitored as indicated by the dash-line M by the management rules engine and activity monitoring database 39 of an executable semantic network 41.

Having a learning semantic network at 43 on the basis of which the user is acting, this may result in increasing or decreasing confidence level at 42,—higher or lower access authorization levels.

In implementing the preferred embodiment in FIG. 2, the type of biometric keystroke systems of the before-cited patents and publications may be used, as may the systems described in my MIT paper.

Further suitable components or apparatus for implementing the combined block-flow schematic of FIG. 2 may include, also, others of the above cited patents and publications.

Still additional preferred apparatus and components for implementing FIG. 2 are provided in the following Table.

| Neural Network of FIG. 2: | Semantic Network: |
|---|---|
| http://en.wikipedia.org/wiki/Neural_network | http://en.wikipedia.org/wiki/Semantic_network |
| Business Process Management: | Timing Vector Comparator: |
| http://en.wikipedia.org/wiki/Business process management | http://en.wikipedia.org/wiki/Time dependent vector field |
| Password: | Confidence Interval: |
| http://en.wikipedia.org/wiki/Password | http://en.wikipedia.org/wiki/Confidence level |

When so implemented, in recapitulation, a user 1, FIG. 1, requiring authentication for use in accessing a data information system 2 (for example, by the Internet shown at I), is provided with an input device such as keyboard to access a data access machine (G, H, J, etc.) of an information system 2 the security of which is being monitored. At the input at 3, FIG. 2, the user's login-name and password is passed on through protocol transport illustrated at Http/Https or (SMS) to the Internet (I) for transmission to the system access machine. A prepared user password training database compares biometric input data, gathered from the rhythm and nature of the keystroke of the input "keyboard", and other input data with the username and password and other environmental data accumulated, such comparison occurring as part of a neural network which will assign weights and verify the timing vectors of input to the "keyboard", that have been established in the training database by the owner.

In the semantic network portion (41) of FIG. 2, in addition, confidence level rules are established in the database (35) which represents the degree of confidence so far that the user has established in requesting certain levels of access to the security of the system.

Using the artificial intelligence (AI) architecture in a security setting as provided by the present invention, the party seeking access will be asked successive questions Q1,Q2,Q3 etc., (27) which will come from the owner's personal database at (25) in response to the confidence level (23) measured by the time of response to the personal questions that this user has so far evidenced. The comparison and assigned weights (12) of the user's response to these questions that are personal to the owner affords the basis for improving or demoting the confidence level for access.

If it appears from these response times to successive personal owner questions that there is high confidence (31) that the user is indeed who he says he is, the system will permit of access (37) to a desired degree; otherwise the user's confidence level will be demoted for accessing the system. This mechanism for applying the user's timing vector to the trained neural network at (11) enables the comparing the difference at (13) between such input and the output of the neural network with a predetermined established threshold. If the difference is not greater than such threshold, the user will be permitted full access to the system (37); while the user will be demoted in confidence level or totally prohibited from accessing the system, if otherwise.

Thus, in summary, the preferred user authenticated method of the invention involves controlling the user's access to the data information system by:
  i. inputting at such input the owner's login name and password, "such as the illustrated keyboard input device" at (B);
  ii. extracting the owner's timing vectors (7) from biometric inputting characteristics which the owner has repeatedly typed passwords to form a training set database as at (5);
  iii. setting up the semantic network (41) using multiple links to indicate that different pattern components of a user's behavioral access to the input (such as keystroke timing and dwell timing) create different kinds of symbolic representations rather than simple connections and links;
  iv. the neural network as setup by using each of the owner's timing vectors as at (5-7) in the training set as the input thereto;
  v. and checking if the user's password is identical to the owners password when a user thereafter inputs the owners' login name and password;
  vi. permitting extracting the users timing vector from the owners inputting characteristics to derive the users password if said checking is affirmative;
  vii. otherwise, demoting the user in confidence level as at (23$^1$) for accessing the system;
  viii. comparing the difference between the users timing vector applied to the trained neural network at (11) with the output of the neural network with a predetermined threshold; and
  ix. then permitting user access to the system (37) if the difference is not greater than said threshold, while demoting the confidence level (43) or totally prohibiting access to the system, if otherwise.

Another exemplary embodiment illustrating how a system using traditional security models, such as above described, may incorporate the novel AI ideas and architecture of the invention into the security model, in accordance with the present invention, is the following:
  1. The user A attempted to login with the wrong password (Confidence level 50%)
      a. The system would trigger an event to assume you have simply just made an error and provide you with another try because it assumes no foul play, but would check how other current users were interacting with the system. (Self-Conscious Reflection)
  2. User logged in with the correct password—2$^{nd}$ Attempt (Confidence level 60%)
      a. The system would consider the recent access attempt and log the change in password state to reflect what access variables might have changed and look for ways to avoid system changes or try another method based on simple log-in errors to create the ideal access state. (Self-Reflective Thinking)
  3. User types a signature that is "very similar" (Confidence level 70%)
      a. The system would assume a commonsense state whereby its confidence level would be trending directionally higher based on the prior trial and error access states—yet continue to monitor its "diagnostician" reasoning. (Reflective Thinking)
  4. User typing from known host (Confidence level 80%)
      a. The system would consider several alternatives for an increase in confidence level and tries to decide which would be best based on comparing other relationships (Deliberative Thinking)
  5. User log-in is during their normal working hours (Confidence level 90%)
      a. The system learned from prior stored data states that when the user reaches this level of confidence it quickly promotes its confidence level. (Learned Reactions)
  6. User given "Secret" level authority
      a. The system quickly assigns the appropriate security level based on its confidence level of the user (Instinctive Reactions)

Further modifications will occur to those skilled in this art, and such are considered to fall within the spirit and scope of the invention as defined in the appended claims.

What is claimed is:

1. A method of providing additional security to a user's accessing of a secure information system, by password, ID and dynamic biometric inputting characteristics of the user, comprising:
  incorporating an artificial intelligence (AI) architecture feature wherein highly personal questions said highly personal questions having not previously been answered by an owner of the password and ID are asked of the user that only said owner of the password and ID would be able to answer instantaneously from the subconscious mind, as distinguished from a user other than the owner who would require a finite response time, said response time being the time between said asking a highly personal question and commencement of a response by said user;
  establishing access-authorization confidence levels in accordance with such response times;
  measuring the time for the user to commence responding to such personal questions; and assigning a level of confidence for access in accordance with such measured response times.

2. A method for identity confirmation in a secure system, comprising:

Prompting, with an artificial intelligence feature, input of highly personal user data by a user;

Measuring response time from said prompting until commencement of data input by said user;

Comparing said response time to baseline response time data of said user;

Generating a user score from results of said comparing; and

Allowing to said user a level of access to said secure system consistent with said user score and pre-set score access levels.

3. The method of claim 2, further comprising attempting to promote the confidence level of access authorization by repeating said measurement of response time with additional highly personal data.

4. The method of claim 3, wherein the system uses neural networks to monitor the environment for weighting the network nodes, and an executable semantic network is used for monitoring the behavior of the user.

5. The method of claim 4, wherein, once said system access has been given to the user, the activity of the user in the system is continually monitored to adjust the confidence level in security as determined by subsequent behavior of the user in the system.

6. Apparatus for providing additional security to a user's accessing of a secure information system, by password, ID and dynamic biometric inputting characteristics of the user comprising: an artificial intelligence (AI) engine architecture wherein highly personal questions are generated and asked of the user that only the owner of the password and ID would be able to answer instantaneously, as distinguished from another user other than the owner who would require a finite response time for commencing input of a response; an access-authorization confidence level list established in accordance with such response times; a timer for measuring the time for the user to commence responding to such personal questions; and a confidence level rater for assigning a level of confidence for access in accordance with such measured response times.

7. The apparatus of claim 6, wherein a feedback loop repeatedly questioning the user on said personal questions is effected to attempt to promote the confidence level of access authorization.

8. The apparatus of claim 7, wherein the system uses a neural network to monitor the environment and weighting the network nodes and an executable semantic network for monitoring the behavior of the user.

9. The apparatus of claim 8, where once said system access has been given to the user, the activity of the user in the system is continually monitored to adjust the confidence level in security as determined by subsequent behavior of the user in the system.

10. A user authentication method for use in controlling user access to a data information system having an input, that comprises, inputting at such input the owner's log-in name and password; extracting the owner's timing vectors from biometric inputting characteristics with which the owner repeatedly inputs the owner's password to form a training set; setting up a semantic network using multiple links to indicate that different pattern components of a user's behavioral access to the input create different kinds of symbolic representations rather than just simple connections or links; setting up neural network training by using each of the owner's timing vectors in the training set as the input thereto; checking if the user's password is identical to the owner's password when a user thereafter inputs the owner's log-in name and password; extracting the user's timing vector from said user's inputting characteristics to derive the user's password if user-checking is affirmative; otherwise, demoting the user in confidence level for accessing the system; applying the user's timing vector to the training neural network as an input; comparing the difference between such input and an output of the neural network with a predetermined threshold; and permitting user access to the system if the difference is not greater than such threshold, while demoting the confidence level or totally prohibiting access to the system, if otherwise; and wherein artificial intelligence (AI) architecture features are added to the system wherein highly personal questions are asked of the user that only the owner of the password and ID would be able to answer instantaneously, as distinguished from another user other than the owner who would require a finite response time to commence a response; establishing access authorization confidence levels in accordance with such response times; measuring the time for the user to commence responding to such personal questions; and assigning a level of confidence for access in accordance with such measured response times.

11. The method of claim 10, wherein repeated questioning of the user on such personal questions is effected to attempt to promote the confidence level of access authorization.

12. The method of claim 11, wherein the system uses a neural network to monitor the environment for weighting the network nodes and an executable semantic network for monitoring the behavior of the user.

13. The method claim 10, wherein once said system access has been given to the user, the activity of the user in the system is continually monitored to adjust the confidence level in security as determined by subsequent behavior of the user in the system.

14. A user authentication method for use in controlling access to a computer system having a keyboard, that comprises, inputting at such keyboard the owner's log-in name and password; extracting the owner's timing vectors from keyboard stroke characteristics with which the owner repeatedly has typed the owner's password to form a training set; setting up a semantic network using multiple links to indicate that different pattern components of a user's behavioral access create different kinds of symbolic representations rather than just simple connections or links; setting up neural network training by using each of the owner's timing vectors in the training set as input thereto; thereafter when a user inputs the owner's log-in name and password, checking if the user's password is identical to the owner's password; extracting the user's timing vector from a keystroke characteristic to type the user's password if the checked result is affirmative; otherwise, demoting the user in confidence level for accessing the system; applying the user's timing vector to the trained neural network as in input; comparing the difference between such input and an output of the neural network with a predetermined threshold; and permitting user access to the system if the difference is not greater than such threshold, while demoting the confidence level or prohibiting access to the system, if otherwise; and monitoring the user's response time to commence answering questions personal to the owner to adjust the setting of the confidence level.

15. The method claimed in claim 14 wherein artificial intelligence architecture features are added to the system in which highly personal questions are asked of the user that only the owner of the password and ID would be able to answer instantaneously, as distinguished from another user other than the owner who would require a finite response time for commencement of a response; establishing excess authorization confidence levels in accordance with such response times; measuring the time for the user to commence responding to such personal questions; and assigning a level of confidence for access in accordance with such measured response times.

16. The method of claim 14 wherein repeated questioning of the user on such personal questions is effected to attempt to promote the confidence level of access authorization.

17. The method of claim 14 wherein the system uses a neural network to monitor the environment for the weighted network nodes, and an executable semantic network for monitoring the behavior of the user.

18. The method of claim 14 wherein once said system access has been given to the user, the activity of the user in the system is continually monitored to adjust the confidence level in security as determined by the subsequent behavior of the user in the system.

19. The method of claim 18 wherein the continual monitoring is carried out by an activity monitoring database and a business process/work flow management rules entered.

20. A user authentication apparatus for use in controlling access to a data information system having an input, comprising: an input device to log-in the owner's name and password; an output extractor of the owner's timing vectors from inputting characteristics with which the owner repeatedly has inputted the owner's password to form a training set; a semantic network using multiple links to indicate that different pattern components of a user's behavioral access to the input device create different kinds of symbolic representations rather than just simple connections or links; a neural network training set created by using each of the owner's timing vectors in the training as the input thereto; a comparer for checking if the user's password is identical to the owner's password when a user thereafter inputs the owner's log-in name and password; an extractor of the user's timing vector from said user's inputting characteristics to derive the user's password if said checking is affirmative; and otherwise, demoting the user in confidence level for accessing the system; connections applying the user's timing vector to the trained neural network as an input; a further comparator for comparing the difference between such input and an output of the neural network with a predetermined threshold; and a decision engine permitting user access to the system if the difference is not greater than such threshold, while demoting the confidence level or totally prohibiting access to the system, if otherwise; and a processor for monitoring the user's response time to commence answering questions personal to the owner to adjust the setting of the confidence level.

21. A method for identification confirmation of a user's identity during login to a secure system, comprising:
Prompting input of highly personal user data with an artificial intelligence feature, said artificial intelligent feature having both semantic and neural components, said highly personal data being data which an owner user would commence answering substantially without hesitation, but which a non-owner user would have a measurable response commencement hesitation;
Measuring response time of a user, said response time being the time between said prompting input and commencement of a response by said user; and
Assigning, in accordance with preset access-authorized confidence levels, a level of confidence for access processed from said response time using said artificial intelligence feature, said feature measuring the reflective thinking ability of said user.

* * * * *